United States Patent
Bello (12)

(10) Patent No.: US 7,051,679 B2
(45) Date of Patent: May 30, 2006

(54) HEAT EFFICIENT ANIMAL SHELTER

(76) Inventor: Paul Bello, 4771 Jones Rd. SE., Salem, OR (US) 97302

( * ) Notice: Subject to any disclaimer, the term of this patent is extended or adjusted under 35 U.S.C. 154(b) by 0 days.

(21) Appl. No.: 10/860,571

(22) Filed: Jun. 2, 2004

(65) Prior Publication Data
US 2005/0268859 A1    Dec. 8, 2005

(51) Int. Cl.
*A01K 1/03*    (2006.01)
(52) U.S. Cl. ...................... 119/482; 119/706
(58) Field of Classification Search ............... 119/482, 119/484, 485, 500, 706, 843, 165, 452, 467, 119/847; 482/52; 472/48; 182/115; 52/7, 52/185; 446/479, 476
See application file for complete search history.

(56) References Cited

U.S. PATENT DOCUMENTS

| 1,538,368 | A | * | 5/1925 | Youngberg | .................. 119/310 |
|---|---|---|---|---|---|
| 1,801,724 | A | * | 4/1931 | Conklin | ........................ 434/72 |
| 2,097,273 | A | * | 10/1937 | Feist | ............................ 482/52 |
| 4,078,343 | A | * | 3/1978 | Moore, Jr. | .................... 52/79.1 |
| 4,367,695 | A | | 1/1983 | Lance | ........................... 119/19 |
| 5,320,065 | A | * | 6/1994 | Leopold | ...................... 119/498 |
| 5,383,313 | A | | 1/1995 | Deeke et al. | .................. 52/82 |
| 5,448,965 | A | * | 9/1995 | McClure | ...................... 119/482 |
| 5,727,501 | A | | 3/1998 | York | ........................... 119/497 |
| 5,809,704 | A | * | 9/1998 | Stewart et al. | ............. 52/169.4 |
| 5,809,936 | A | * | 9/1998 | Wall | ............................ 119/484 |
| 5,855,187 | A | * | 1/1999 | Tominaga | .................... 119/452 |
| 6,234,116 | B1 | | 5/2001 | Havener | ...................... 119/482 |

FOREIGN PATENT DOCUMENTS

GB    2 148 087 A    *    5/1985

* cited by examiner

*Primary Examiner*—Robert P. Swiatek
(74) *Attorney, Agent, or Firm*—Marger Johnson & McCollom, P.C.

(57) ABSTRACT

A pet shelter that is substantially smaller than a single family human residential structure includes an accessway, a platform that is located at a first level above the accessway, and a device configured to assist a pet in moving between the accessway and the platform.

20 Claims, 3 Drawing Sheets

HEAT EFFICIENT ANIMAL SHELTER

BACKGROUND OF THE INVENTION

1. Technical Field of the Invention

This disclosure relates generally to animal care products, and more particularly to a heat efficient animal shelter.

2. Description of the Related Art

In U.S. Pat. No. 4,367,697 issued to Lance, a dog house is described that is made by mounting a barrel atop a vertical pole, the barrel lying on its side. An entrance is cut in one end of the barrel, and the dog reclines or sits upon an inside surface of the barrel that is lower than the level of the entrance.

In U.S. Pat. No. 5,383,313 issued to Deeke et al., a mini storage silo is described that has an elevated floor. The storage silo may be used as a dog house, but the canine entryway is set into the one of the walls just above the level of the elevated floor.

In U.S. Pat. No. 5,727,501 issued to York, a dog house apparatus is described where the dog reclines or sits upon a floor that is lower than the level of an entryway.

In U.S. Pat. No. 6,234,116 issued to Havener, a heat retaining dog house is described where the entryway is set into one of the walls above the level of the elevated floor.

An entryway that is higher than the surface where the animal sits or reclines is not desirable in an animal shelter that purports to insulate the animal from temperature extremes. The air that is warmed by the animal's body rises and may be lost through the entryway, or it is trapped in the upper part of the animal shelter, away from the animal that remains on the floor of the shelter. Additionally, the animal may be exposed to winds or drafts if the entryway is not offset from the level where the animal sits or reclines.

Embodiments of the invention address these and other disadvantages of the conventional art.

DETAILED DESCRIPTION OF THE INVENTION

Figure 1:
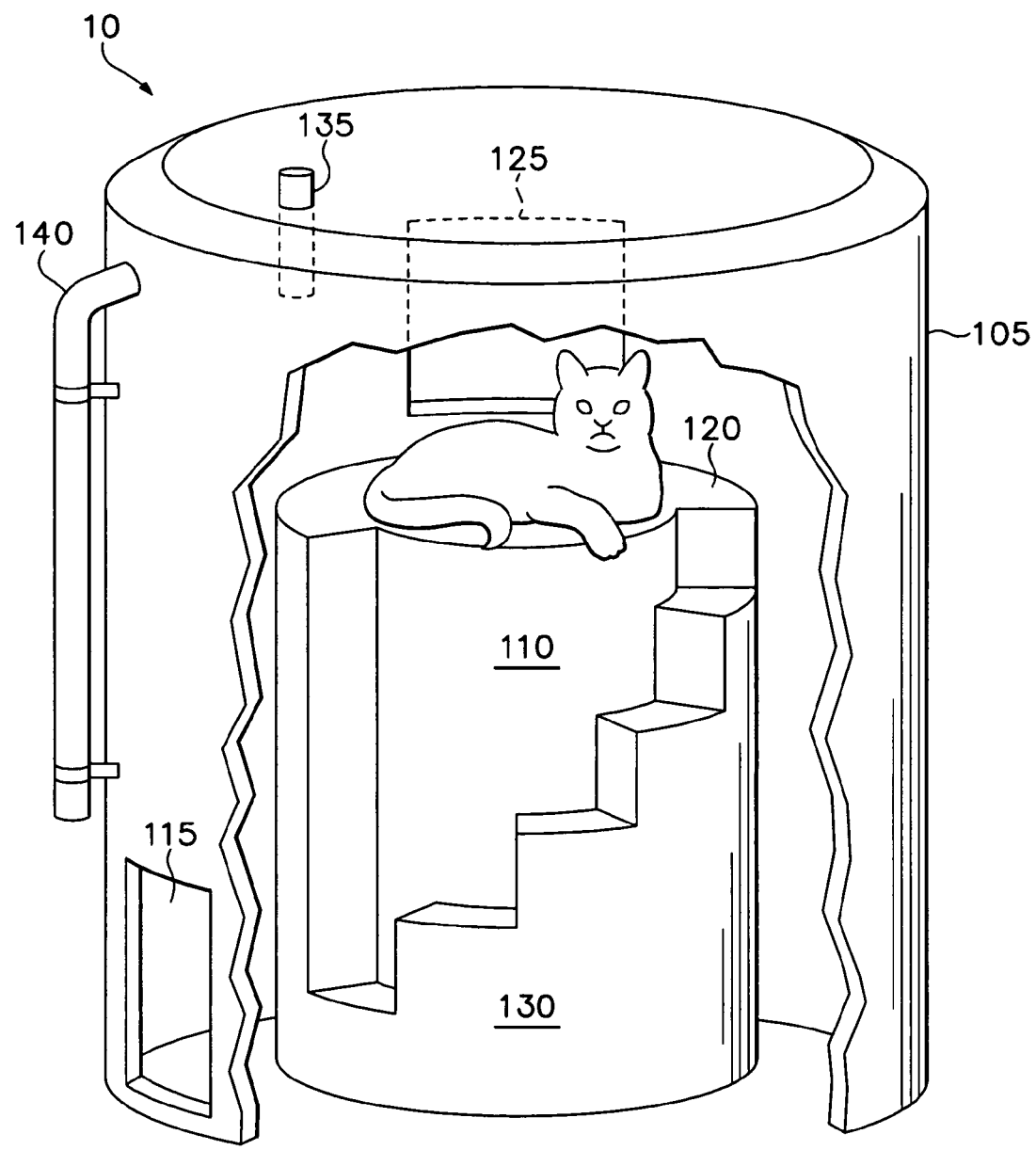
FIG. 1 is a cut-away diagram illustrating an example animal shelter according to some embodiments of the invention.

FIG. 1 is a cut-away diagram illustrating an example animal shelter 10 according to some embodiments of the invention.

As illustrated, the insulated animal shelter 10 includes an outer shell 105 and an inner shell 110. The outer shell 105 and the inner shell 110 are substantially cylindrical in shape, with the inner shell 110 nested inside the outer shell 105. The wall of the outer shell 105 preferably includes an insulative material, such as styrofoam or fiber insulation. Preferably, the wall of the inner shell 110 is of the same construction as the outer shell 105. The amount of insulating material or the thickness of the walls may be chosen depending on the climate where the shelter 10 is to be used. For example, thicker insulative walls may be used for climates where winter temperatures are frequently below freezing, and thinner insulative walls may be used in climates where freezing temperatures are less common.

There is an opening 115 at the base of the outer shell 105. From the opening 115, the animal gains access to a stair 130 that is attached to the side of the inner shell 110. Preferably, as shown in FIG. 1, the stair 130 is an integral part of the inner shell 110. The stair 130 leads to a sleeping platform 120, which is the top surface of the inner shell 110. Preferably, as shown in FIG. 1, the radial outer surface of the inner shell 110 and the radial outer surface of the stair 130 are formed of one continuous surface. In other words, if a cylinder of appropriate diameter was placed over the inner shell 110 and the stair 130, the radial inner surface of the cylinder would contact the radial outer surface of the inner shell 110 and the radial outer surface of the stair 130.

As illustrated in FIG. 1, the radial inner surface of the outer shell 105 is slightly separated from the radial outer surface of the inner shell 110 and the stair 130. However, as was suggested in the above paragraph, the outer shell 105 could be made such that the radial inner surface of the outer shell 105 contacts the radial outer surface of the inner shell 110 and the radial outer surface of the stair 130. Thus, the interior volume of the shelter 10 would be minimized, making it easier for the animal's body heat to warm the interior volume. In this case, the opening 115 should be aligned with the bottommost step of the stair 130 so that the animal can gain access to the stair.

Consequently, by choosing appropriate dimensions for the outer shell 105 and inner shell 110, the sleeping platform 120 and interior volume of the animal shelter 10 may be optimized for the size and number of animals that will be using the shelter.

According to preferred embodiments of the invention, the outer shell 105 is detachably affixed to the inner shell 110 and the stair 130 so that it may be removed to expose the inner shell 110, the stair 130, and sleeping platform 120 for effective cleaning.

In alternative embodiments of the invention, there may be two openings 115 and two stairs 130. The extra opening and extra stair would provide a means of egress for the animal if an intruding animal attempted to gain access to the sleeping platform 120. Carpeting or other bedding material may be affixed to the sleeping platform 120.

To further provide a sense of security for the animal, there may be one or more windows 125 installed in the wall of the outer shell 105 so that the animal may visibly monitor the outside world. Preferably, the windows 125 are made of a transparent plastic, but other embodiments may have glass windows.

The height and width of the shelter 10 is a design choice, and the actual dimensions will be determined by the size of the animal and/or the number of animals that will be using the shelter. As illustrated in FIG. 1, the sleeping platform 120 is located above the level of the opening 115. Thus, the shelter 10 efficiently utilizes warmed air by trapping it against the roof of the outer shell 105 at substantially the same level where the animal is reclining or sitting. The sleeping platform 120 is also sheltered from drafts and winds by being above the level of the opening 115. Furthermore, there is an adequate exchange of fresh air since the opening 115 near the bottom of the outer shell 105 allows the heavier $CO_2$ exhaled by the animal to be replaced with lighter $O_2$.

Embodiments of the invention also provide for the removal of methane gas, a by-product of animal digestion that may be potentially harmful to the animal if allowed to accumulate in the shelter 10. Methane is about 60% the weight of air, so it will accumulate in the highest portion of the shelter 10.

Therefore, according to some embodiments of the invention, there is a methane vent 135 installed in the outer shell 105. Preferably, the methane vent 135 is configured to vent methane gas from at or near the highest part of the shelter 10 to the exterior of the shelter 10. The methane vent 135 is preferably formed of a plastic or metal tube. Because the size of the methane vent 135 need not be very large to effectively remove the methane gas, the amount of beneficial heated air that is lost through the methane vent 135 does not appreciably reduce the heat efficiency of the shelter 10. In other words, the size of the methane vent 135 may be adjusted so that methane is vented while simultaneously minimizing the heat loss through the methane vent 135. Although not shown in FIG. 1, in alternative embodiments of the invention the top of the methane vent 135 may have a shield placed above it, similar to a covered chimney on houses. The shield prevents rain and snow from entering the shelter 10, while still allowing methane gas to escape.

In some embodiments of the invention, the removal of water vapor from the shelter 10 may be accomplished using a moisture vent 140. The moisture vent 140 is preferably made of a metal tube, such as copper. The moisture vent 140 may be affixed substantially vertically on the outside of the outer shell 105. The upper end of the moisture vent 140 is angled and pierces the outer shell 105, so that the upper end of the moisture vent is located in an upper portion of the shelter 10, near the sleeping platform 120.

Since most of the moisture vent 140 lies outside the shelter 10 and metal is a good conductor, the temperature of the metal tube will typically closely match the temperature outside the animal shelter 10. Thus, when cooler temperatures are present, gaseous water vapor inside the animal shelter 10 will tend to condense on the cool inner metal surface of the moisture vent 140, where it will drain away to the outside of the shelter 10. Preferably, the upper end of the moisture vent 140 does not extend past the radially inner wall of the outer shell 105, so that water vapor will not condense on the outer surface of the moisture vent 140 and cause the interior of the shelter 10 to become wet.

It should be noted that the moisture vent 140 is illustrated as being attached to the outer shell 105 above the opening 115 for ease of illustration. The moisture vent 140 may alternatively be located in any convenient location on the outer shell 105, and it is preferable that the moisture vent 140 drains to an area that is not immediately in front of the opening 115.

Figure 2:
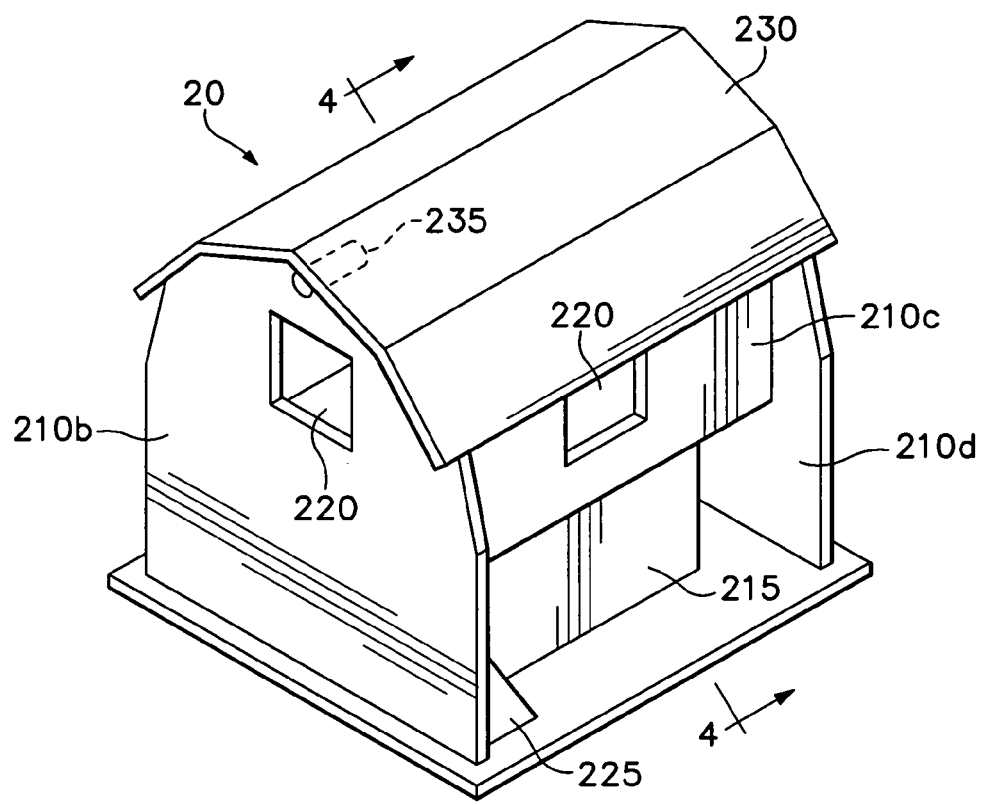
FIG. 2 is a perspective diagram illustrating another example animal shelter according to some other embodiments of the invention.
Figure 4:
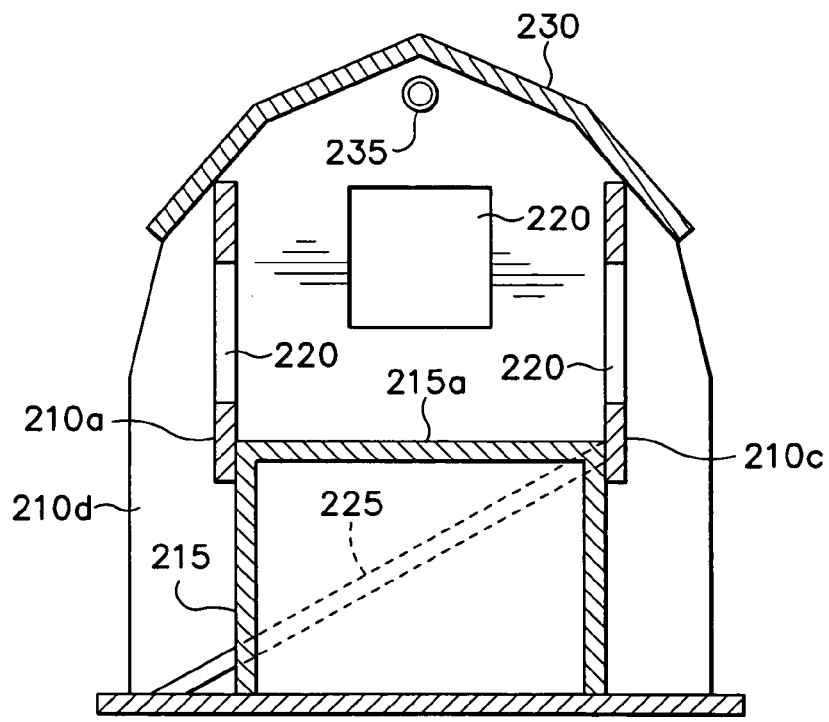
FIG. 4 is a cross-sectional diagram further illustrating the example animal shelter of FIG. 2.
Figure 3:
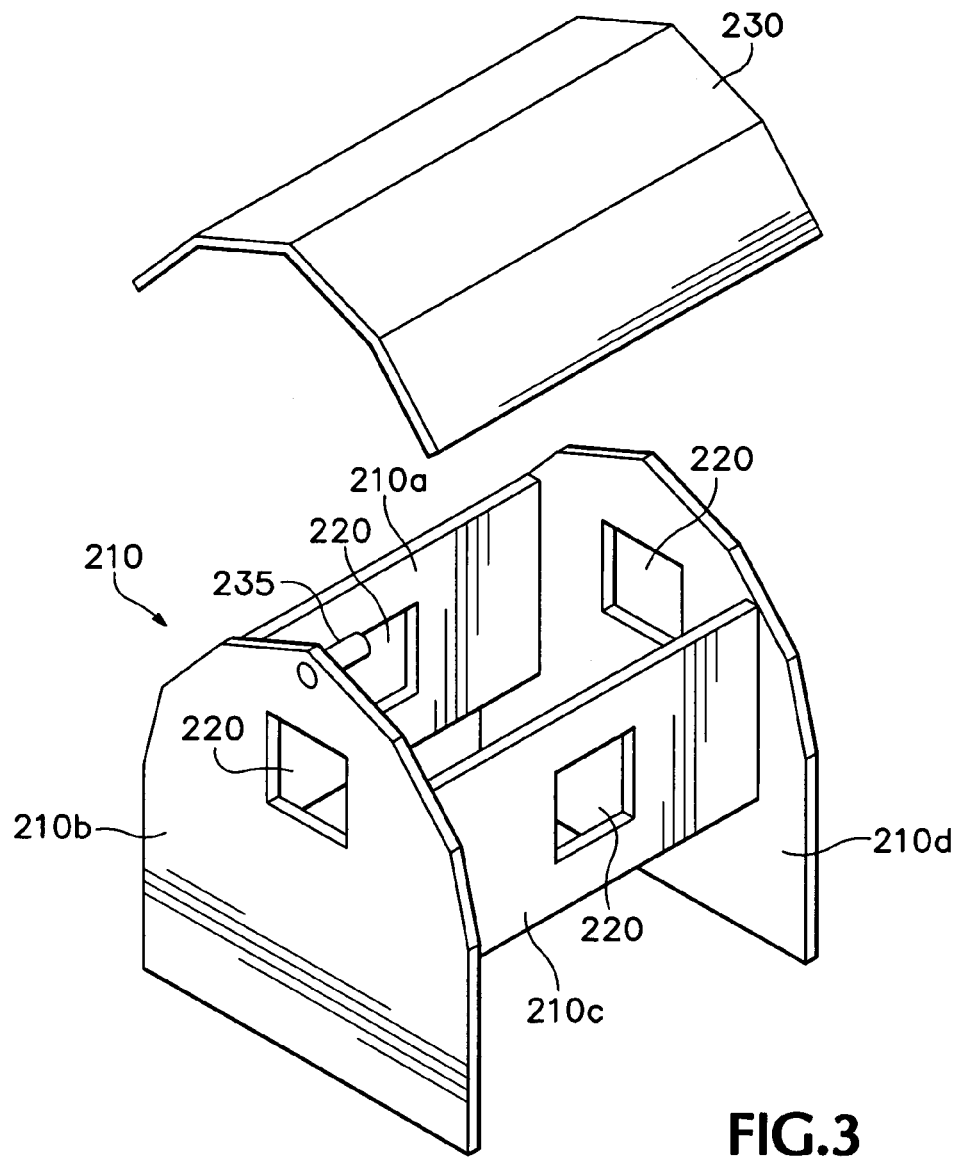
FIG. 3 is an exploded perspective diagram further illustrating components of the example animal shelter of FIG. 2.
Figure 3:
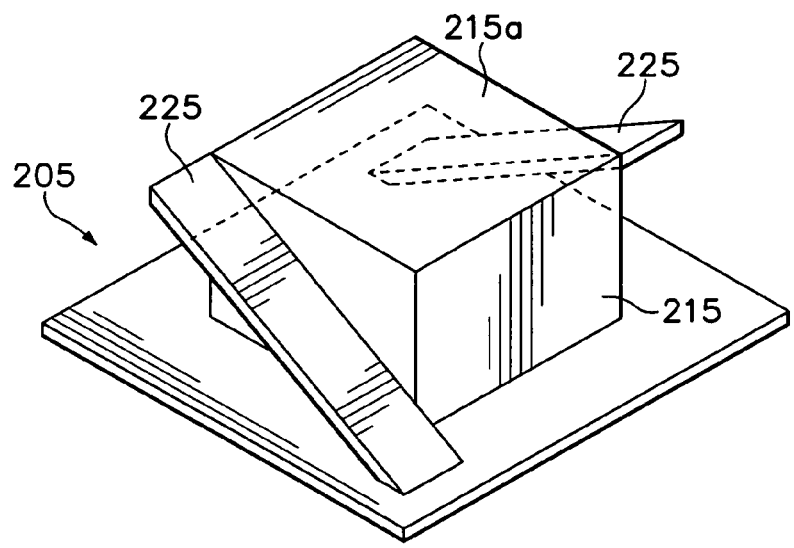

FIG. 2 is a perspective diagram illustrating another example animal shelter 20 according to some other embodiments of the invention. As illustrated in FIG. 2, the animal shelter 20 looks substantially like a barn. FIG. 3 is an exploded perspective diagram further illustrating components of the example animal shelter of FIG. 2. FIG. 4 is a cross-sectional diagram further illustrating the example animal shelter of FIG. 2.

Referring to FIGS. 2, 3, and 4, the example animal shelter 20 according to some embodiments of the invention includes a base unit 205, a wall unit 210, and a roof 230. The base unit 205 includes a pedestal 215 and two ramps 225. The two ramps 225 are affixed to opposite ends of the pedestal 215. The sleeping platform 215a is the top surface of the pedestal 215. The two ramps 225 provide the animal access to the sleeping platform 215a.

The wall unit 210 includes four walls 210a, 210b, 210c, and 210d, each wall having a window 220. Preferably, similar to the above embodiments having the outer shell 105 and the inner shell 110, the wall unit 210 is designed to fit over the base unit 205. In other words, when the wall unit 210 is placed over the base unit 205, the walls 210b and 210d contact the edges of the ramps 225, while the walls 210a, 210c contact opposite sides of the pedestal 215. The walls 210a, 210c, do not completely extend to the floor of the base unit 205. Thus, as shown in FIG. 2, when the wall unit 210 is placed over the base unit 205, the ramps 225 allow entry to the sleeping platform 215a.

Similar to the embodiments illustrated in FIG. 1, both the walls of the wall unit 210 and the pedestal 215 of the base unit 205 are preferably insulated. The four windows allow the animal to see his surroundings, and the additional ramp 225 provides an escape route for the animal should it be required.

Similar to the embodiments illustrated in FIG. 1, the shelter 20 provides a sleeping platform 215a that is above the level of the entryway. Consequently, the shelter 20 effectively protects the animal from wind and precipitation while also making maximum use of the warm air that is trapped by the shelter.

Similar to the embodiments illustrated in FIG. 1, the shelter 20 also has a methane vent 235. Although the shelter 20 is not shown with a moisture vent, such as the moisture vent 140 illustrated in FIG. 1, it is anticipated that one of ordinary skill could easily modify the shelter 20 to include such a vent using the principles that have been illustrated above.

The preceding embodiments are exemplary. Although the specification may refer to "an", "alternative", or "some" embodiment(s) in several locations, this does not necessarily mean that each such reference is to the same embodiment(s), or that the feature only applies to a single embodiment.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

Many of the specific features shown herein are design choices. For example, the exterior look of embodiments of the invention may be representative of any number of architectural styles in order to mimic the design of the larger buildings surrounding the animal shelter. As just a few examples, animal shelters according to embodiments of the invention may suggest design elements of a farm building (such as the barn illustrated in FIG. 2), a Victorian style home, or a medieval castle. Furthermore, the materials used for the embodiments are also design choices, as in order to mimic different architectural styles different materials may be a necessity.

Functionality shown embodied in a single component may be implemented using multiple cooperating components, or vice versa. For example, in the exemplary embodiments illustrated above, the outer shell 105 and inner shell 110, and, likewise, the wall unit 210 and the base unit 205, are intended to be detachably affixed to each other for ease of cleaning and maintenance. However, it is recognized that embodiments of the invention could be assembled in other ways. For example, with regard to the embodiments illustrated in FIG. 1, injection molding techniques could be utilized to manufacture an animal shelter where the outer shell 105 is formed from a single piece of molded plastic as is the inner shell 110/stair 130. Alternatively, the outer shell 105/inner shell 110/stair 130 could be formed of a single piece of molded plastic. The methane vent 135 of FIG. 1 may also be an integral feature of the outer shell 105, for example, the methane vent 135 may be formed during the same plastic injection-molding process that forms the outer shell 105. In another example, the components of the embodiments illustrated in FIGS. 2 and 3 could be permanently affixed to each other using conventional fasteners. Such minor modifications are encompassed within the embodiments of the invention, and are intended to fall within the scope of the appended claims.

I claim:

1. A pet shelter that is substantially smaller than a single family human residential structure, the pet shelter comprising:
    an inner shell that encloses and defines a first space, the inner shell structured to prevent a pet from accessing the first space, the inner shell having a top surface that is substantially flat; and
    an outer shell that substantially surrounds the inner shell, the outer shell and inner shell structured such that a longitudinal line passing vertically through a center of the outer shell intersects the top surface of the inner shell, the outer shell having an opening in a bottom portion of the outer shell that is substantially lower than the top surface of the inner shell, the opening structured to permit a pet access to a second space that is immediately between the top surface of the inner shell and the outer shell.

2. The pet shelter of claim 1, the outer shell further comprising a window opening, the window opening structured to hold a window.

3. The pet shelter of claim 1, the outer shell and the inner shell comprising a material selected from the group consisting of styrofoam and fiber insulation.

4. The pet shelter of claim 1, the inner shell further comprising a device configured to assist the pet in moving between the opening and the top surface.

5. The pet shelter of claim 4, the device selected from the group consisting of a stair and a ramp.

6. The pet shelter of claim 1, a vertical inner surface of the outer shell structured to contact a vertical outer surface of the inner shell, the inner shell structured to be removed from within the outer shell by sliding it from a bottom of the outer shell.

7. The pet shelter of claim 1, further comprising a metal tube, the metal tube having a portion that penetrates the outer shell, the metal tube configured to condense and remove water vapor from the pet shelter.

8. A pet shelter that is substantially smaller than a single family human residential structure, the pet shelter comprising:
    an outer wall;
    an accessway through the outer wall;
    a platform, the platform located at a first level above the accessway and in sliding engagement with the outer wall; and
    a device configured to assist a pet in moving between the accessway and the platform, the device configured to prevent the pet from occupying a region that is directly beneath the platform.

9. The pet shelter of claim 8, the outer wall comprising an insulated wall that substantially surrounds the platform.

10. The pet shelter of claim 9, further comprising a window that is arranged in a window opening in the insulated wall, the window opening located at a second level that is substantially above the first level.

11. The pet shelter of claim 10, the window selected from the group consisting of glass and transparent plastic.

12. The pet shelter of claim 8, the device selected from the group consisting of a stair and a ramp.

13. The pet shelter of claim 8, further comprising:
    a roof; and
    a metal tube, the metal tube structured to condense water vapor and remove the condensed water vapor from the inside of the pet shelter.

14. An animal shelter that is substantially smaller than a single family human residential structure, the animal shelter comprising:
    an inner pedestal with substantially vertical walls supporting a topmost surface;
    an outer wall that encloses the inner pedestal to define a space immediately between the topmost surface and the outer wall, the topmost surface substantially disconnected from the outer wall, the space structured to provide a primary living area for an animal located within the animal shelter, the outer wall having an opening below the topmost surface that is structured to allow the animal to enter and leave the animal shelter; and
    an accessway, a first end of the accessway located immediately adjacent to the topmost surface, and a second end of the accessway located immediately adjacent to the opening, the accessway disposed between the inner pedestal and the outer wall.

15. The animal shelter of claim 14, the accessway comprising one chosen from the group consisting of a stair and a ramp.

16. The animal shelter of claim 14, the outer wall comprising a window, the window located substantially above the top surface.

17. The animal shelter of claim 16, the window selected from the group consisting of glass and transparent plastic.

18. The animal shelter of claim 17, the outer wall further comprising an insulated wall.

19. The animal shelter of claim 14, the inner pedestal comprising insulating material.

20. The animal shelter of claim 14, further comprising a vent configured to remove methane gas from an upper portion of the shelter.

\* \* \* \* \*